(No Model.)
2 Sheets—Sheet 1.
J. B. MORRISON.
CULTIVATOR.
No. 332,355.   Patented Dec. 15, 1885.
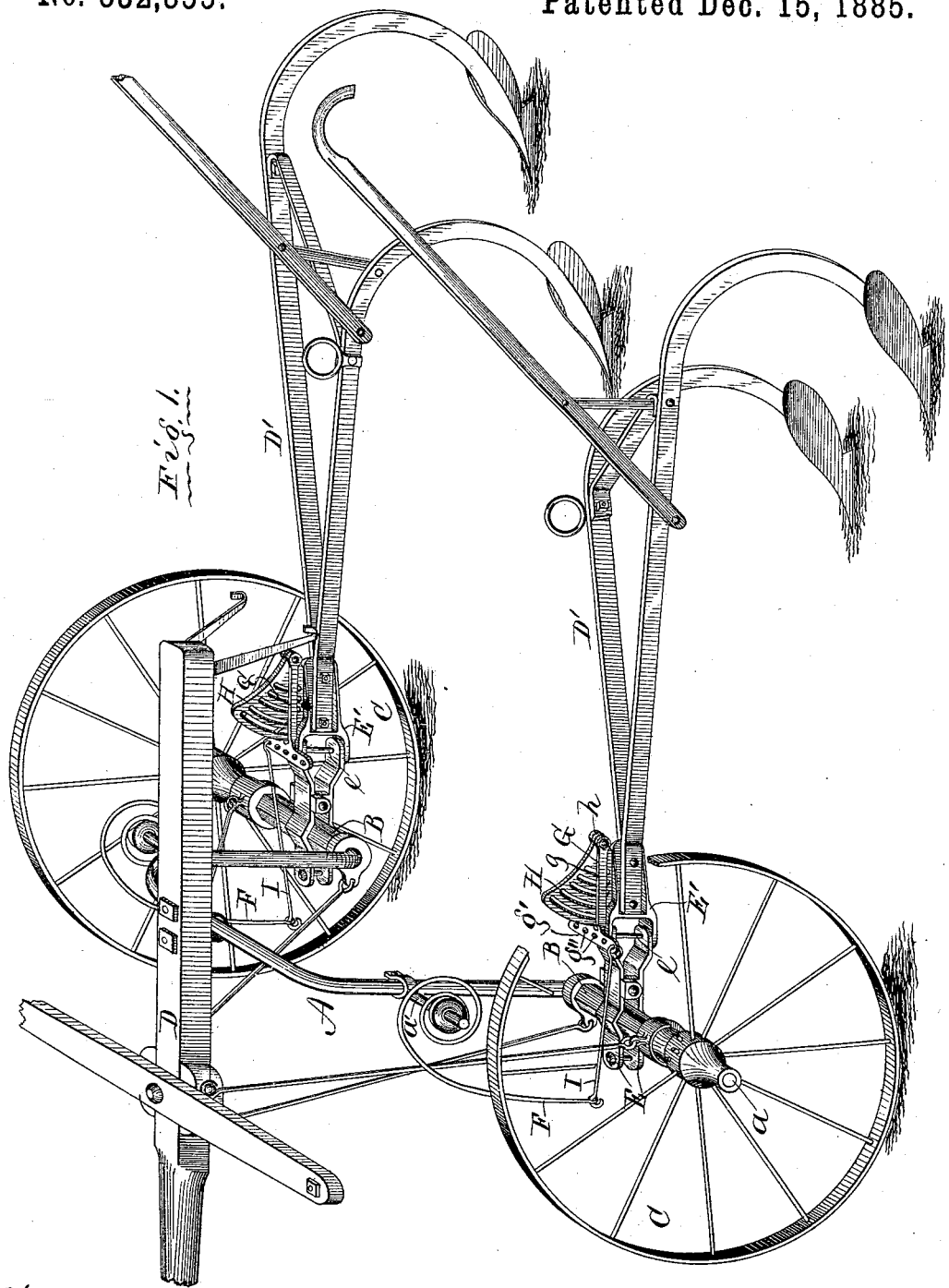
Witnesses:
S. R. Richards.
C. V. Holden.
Inventor:
J. B. Morrison,
By W. B. Richards,
Atty.

(No Model.)  2 Sheets—Sheet 2.
J. B. MORRISON.
CULTIVATOR.
No. 332,355. Patented Dec. 15, 1885.
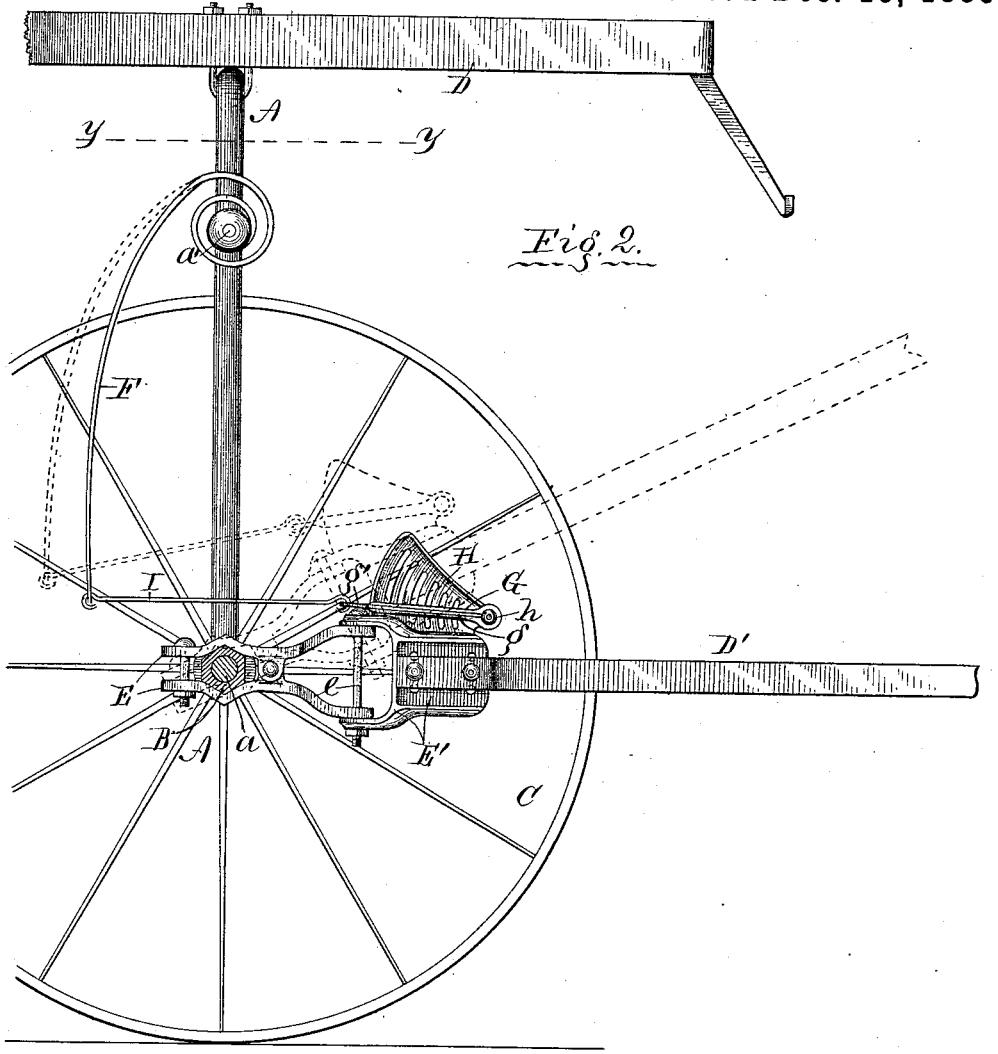
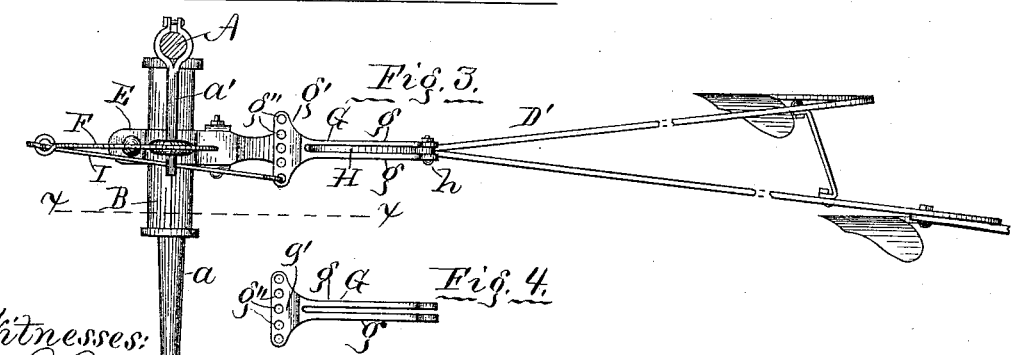
Witnesses:
C. R. Richards
F. F. Holden
Inventor:
J. B. Morrison,
By W. B. Richards,
Atty.
N. PETERS, Photo-Lithographer, Washington, D. C.

UNITED STATES PATENT OFFICE.

JOSEPH B. MORRISON, OF FORT MADISON, IOWA.

CULTIVATOR.

SPECIFICATION forming part of Letters Patent No. 332,355, dated December 15, 1885.

Application filed December 26, 1884. Serial No. 151,220. (No model.)

*To all whom it may concern:*

Be it known that I, JOSEPH B. MORRISON, a citizen of the United States, residing at Fort Madison, in the county of Lee and State of Iowa, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in cultivator lifting-springs. In springs of this class it has always been desirable to make the spring as effective as possible without using springs of very great tension, and to do this it is necessary to connect one end of the spring with the cultivator gang or plow beams at a point some distance in rear of the coupling-joints, and when so connected, as it has heretofore been done, it is found by experience that the spring interferes with other operations of the plows, so as to render the spring of but little practical use, principally because as the plows swing laterally out of the line of draft in either direction, for the purpose of avoiding plants out of line, or following crooked rows of plants, or yielding laterally from the nature of the soil, or from the operation of the shovels, the spring favors such movement as soon as the plow-gang is deflected, and thus resists the efforts of the plowman to bring the cultivators into proper working positions, and the frequency with which he is obliged to thus overcome the force of the spring when so connected with the plow beams or gangs renders their use objectionable.

The main object of my invention is to overcome this difficulty; and to this end my invention consists in a spring connected with the plow-gang by means of a vertically-swinging link, which is hinged at its rear end to the plow gang or beam at any desired distance in rear of the beam coupling-joints, and extends forward, and is connected directly or indirectly with the lifting-spring, and which swinging link is held from lateral movement by means of a guide or guard, which guide or guard is fixed to and projects from the plow-beam in rear of its coupling-joints; and the invention further consists in connecting the spring with the plow-gang by means of a vertically-swinging link, which is hinged at its rear end to the plow gang or beam at any desired distance in rear of the beam coupling-joints, and extends forward to and is connected with the spring at a point in the same vertical plane as the axis of the joint on which the plow gangs or beams swing laterally, means being provided whereby this link may be swung or raised and lowered at its front end, but which cause it to swing with the plow beam or gang laterally, which means are connected with the plow beam or gang in rear of said beam or gang coupling-joints.

A further feature in my invention consists in extending laterally the forward end of the link hereinbefore referred to, and providing means whereby the spring may be connected with it at different points laterally, for the purpose of exerting a constant force laterally on the plow beams or gangs for purposes hereinafter described or for any other desired purpose.

The invention further consists in combinations and constructions hereinafter described.

In the accompanying drawings, which illustrate my invention, and which form a part of this specification, Figure 1 is a perspective of an ordinary type of cultivator with my improvement in one of the various ways in which it may be applied. Fig. 2 is an elevation of my improvement and the main parts of the cultivator in which it is incorporated, partly in section in the line *x x* in Fig. 3. Fig. 3 is a top plan of my improvement and adjacent parts of a cultivator, the axle in section in line *y y* in Fig. 2. Fig. 4 is a top plan of the swinging link.

As the invention relates wholly to the novel manner of applying the springs used in lifting and manipulating the plows, I need only herein explain those parts of a cultivator which are more immediately associated with my invention.

In the drawings, the same reference-letter indicates the same part in the different figures.

I have shown in the drawings a cultivator-axle, A, with horizontal ends *a*, on which are journaled sleeves B, and also supporting-wheels C, and which carries a tongue, D, and have also shown plates E, which are clamped to the sleeves B at their forward ends, and have the beam-plates E', hinged or coupled to their rear ends by a vertical bolt, e, and the plow gangs or beams D', bolted to the rear ends of the plates E'. The plow-gangs D' swing vertically by means of the sleeves B, turning vertically on the axle, and swing laterally by turning on the bolt e as an axis. I have also shown a spring, F, which is coiled at one end, where it is connected to an arm, a', which projects from the axle in such manner that the lower end of the spring may be directly in front of and somewhat above the coupling clamp-plates E, which is a preferable location for it.

The parts hereinbefore described by reference-letters are parts of an ordinary type of cultivator, and for the purposes of my invention may be constructed and arranged as shown, or in any other manner which will admit of applying my improvement thereto.

G is a link or clevis formed of two arms, g, connected at their forward ends by a head, g', which extends laterally beyond the arms g at each side, and is pierced with a series of holes, g'', as shown at Fig. 3.

H is a plate projecting upwardly from the beam-plate E', and is slotted, as shown, to produce lightness, and its forward end is very near the bolt e. The link G is placed with an arm, g, on each side of the plate H, against the sides of the forward end of which plate H the arms g fit snugly, and preferably with the head g' immediately over the bolt e. An axial bolt, h, passes through the rear end of the arms g and the plate H.

I is a link-rod with a hook on one end, which engages with the lower end of the spring F, and a hook on its other end, which engages with any desired hole of the series g''.

In the lifting action of the spring on the plow it will be most effectual on account of its acting through the link G on the plow-gang at some distance in rear of the couplings. When the plow-gang is swung laterally and out of the line of draft, the spring will not tend to draw it any in the same direction, because that arm g of the link G which is on the side of the plate H opposite the direction in which the plow-gang is deflected at its rear end will rest against the forward end of the plate H, and thereby cause the force of the spring, in so far as its action laterally on the plow-gang is concerned, to act at a point immediately over the bolt e, and thereby have no lateral effect on the plow-gang.

By engaging the link-rod I with one of the series of holes g'' to one side of the arms g, the spring may be made to exert a constant lateral force on the plow-gang, and thereby be utilized to resist the tendency of the plow-gangs to swing laterally when twisted shovels or any other shovels are used to throw the soil to one side, or when the plows have a tendency to swing laterally from any other cause. The lateral force to be exerted by the spring is adjustable by using the different holes g''.

At Fig. 3 plow-shovels are shown which would throw the soil toward the left-hand side of the cultivator, and hence the gang would have a tendency to swing to the right hand at its rear end, and at the same figure the link I is connected with link G at that side, as shown, which will resist said tendency of the plow-gang, as stated.

It will readily be seen that the link G may be hinged at its rear end to any upward projection from the plow-gang placed farther back or forward on the plow gang or beam, as desired; and, further, that the plate H may be dispensed with, except merely its upwardly-projecting forward end, and instead of that may be used its equivalent—a projection from the forward end of the link G, extending downward through a slot in the forward end of the beam-plate E'; hence I do not limit my claims to the special construction or arrangements shown.

As more fully and clearly defining the nature and scope of my invention, I may state that its main feature consists not only in hinging the swinging link to the plow beam or gang in rear of the coupling-joint, but also in fixing the fin or guard, which prevents lateral movement of said link to the plow beam or gang also in rear of said coupling; and I desire to call particular attention to this great distinction between my invention and the invention which I do not claim, and which is shown, described, and claimed in Letters Patent to Wm. P. Brown, No. 312,425, in which the part for preventing lateral movement of the swinging link is connected with the coupling-joint, my invention thus becoming an adaptation of the swinging link to the old class of cultivators, in which the lifting-spring was connected to the plow beam or gang, while the invention of Brown, above referred to, is an adaptation of the swinging link to the class of cultivator shown in his patent of May 15, 1877, 190,816.

What I claim as new, and desire to secure by Letters Patent, is—

1. In a cultivator, in combination with an axle, plow-gang hinged thereto to swing vertically and horizontally, and a spring, a head, g', provided with a series of holes, g'', with either of which the spring may be connected, substantially as and for the purpose specified.

2. In a cultivator, in combination, an axle, a plow-gang hinged to swing vertically and horizontally with reference to said axle, a spring, and a swinging link hinged to the plow-gang in rear of its couplings and adapted to swing vertically, while it is held from swinging laterally, and provided at its forward end with a head, g', with holes g'', with either of which the spring may be connected, substantially as and for the purpose specified.

3. The combination, with a vertically and laterally swinging plow-beam, of a spring connected with the plow-beam by a link, the rear end of which link is hinged to the plow-beam in rear of the pivot-bolts on which said plow-beam swings, and the forward end of said link connected with said spring at a point immediately over the pivot-point on which the plow-beam swings laterally, and a guide or fin projecting from the plow beam or gang for preventing lateral deflection of said link, while it permits it to swing freely in a vertical plane, substantially as and for the purpose specified.

4. The combination, with a vertically and laterally swinging plow-beam, of a spring connected with the plow-beam by a link, the rear end of which link is hinged to the plow-beam in rear of the pivots on which said plow-beam swings, and the forward end of said link connected with said spring at a point immediately over the pivot-point on which the plow-beam swings laterally, and a guide or fin projecting from the plow beam or gang for preventing lateral deflection of said link while it permits it to swing freely in a vertical plane, and which guide is located in rear of the vertical pivot-bolt on which the plow gang or beam swings laterally, substantially as and for the purpose specified.

5. The combination, with a vertically and laterally swinging plow-beam, of a lifting-spring connected with the plow-beam by a link, the rear end of which link is hinged to the plow-beam in rear of the pivots on which said plow-beam swings, and a guide or fin for preventing lateral deflection of said link while it permits it to swing freely in a vertical plane, and which guide is located on the plow beam or gang in rear of the vertical pivot-bolt on which said plow beam or gang swings laterally, substantially as and for the purpose specified.

In testimony whereof I affix my signature in presence of two witnesses.

JOSEPH B. MORRISON.

Witnesses:
REUBEN BEARDSLEE,
D. A. MORRISON.